(12) United States Patent  
Uno

(10) Patent No.: US 11,712,927 B2  
(45) Date of Patent: Aug. 1, 2023

(54) TIRE

(71) Applicant: SUMITOMO RUBBER INDUSTRIES, LTD., Hyogo (JP)

(72) Inventor: Hiroki Uno, Hyogo (JP)

(73) Assignee: SUMITOMO RUBBER INDUSTRIES, LTD., Hyogo (JP)

(*) Notice: Subject to any disclaimer, the term of this patent is extended or adjusted under 35 U.S.C. 154(b) by 21 days.

(21) Appl. No.: 17/555,678

(22) Filed: Dec. 20, 2021

(65) Prior Publication Data

US 2022/0203769 A1 Jun. 30, 2022

(30) Foreign Application Priority Data

Dec. 28, 2020 (JP) ................................ 2020-218670

(51) Int. Cl.
*B60C 11/00* (2006.01)
*B60C 9/22* (2006.01)

(52) U.S. Cl.
CPC .......... *B60C 11/005* (2013.01); *B60C 9/2204* (2013.01); *B60C 2011/0025* (2013.01); *B60C 2011/0033* (2013.01)

(58) Field of Classification Search
CPC .... B60C 11/0041; B60C 11/005; B60C 9/185
See application file for complete search history.

(56) References Cited

U.S. PATENT DOCUMENTS

2013/0213545 A1* 8/2013 Tanaka .................... B60C 13/02
152/454
2017/0297377 A1* 10/2017 Honda ................ B60C 11/0304

FOREIGN PATENT DOCUMENTS

| EP | 1033234 A2 * | 9/2000 | ......... B29D 30/0601 |
|---|---|---|---|
| JP | 2005035404 | 2/2005 | |
| JP | 4410505 | 2/2010 | |
| JP | 2011121409 A * | 6/2011 | |
| JP | 2018-2008 | 1/2018 | |
| JP | 2018002008 A * | 1/2018 | |
| JP | 6397628 | 9/2018 | |

(Continued)

OTHER PUBLICATIONS

Machine Translation: JP-2018002008-A, Sueno J, (Year: 2023).*

(Continued)

*Primary Examiner* — Kendra Ly
(74) *Attorney, Agent, or Firm* — Greenblum & Bernstein, P.L.C.

(57) ABSTRACT

In a tire, a tread includes a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C. The intermediate layer is disposed outwardly of the base layer and the cap layer is disposed outwardly of the intermediate layer, in the radial direction. An outer end of the intermediate layer is disposed outwardly of an outer end of the base layer and an outer end of the cap layer is disposed inwardly of the outer end of the intermediate layer, in the axial direction. A difference between an axial width of the cap layer and an axial width of the base layer is not less than −10 mm and not greater than 10 mm.

20 Claims, 7 Drawing Sheets

(56) References Cited

FOREIGN PATENT DOCUMENTS

JP    6772601    10/2020

OTHER PUBLICATIONS

Machine Translation: JP-2011121409-A, Iwasaki N, (Year: 2023).*
Machine Translation: EP-1033234-A2, Peter J, (Year: 2023).*
Extended European Search Report in Corresponding EP Application No. 21209241.5, dated Apr. 8, 2022.

* cited by examiner

TIRE

CROSS REFERENCE TO RELATED APPLICATION

The present application claims priority to Japanese patent application JP 2020-218670, filed on Dec. 28, 2020, the entire contents of which are incorporated herein by reference in its entirety.

BACKGROUND

Technical Field

The present disclosure relates to a tire.

Description of the Background Art

A tire having low rolling resistance is obtained by using rubber having a low-heat-generation property in a tread. A grip force of the rubber having a low-heat-generation property is lower as compared with rubber having a heat generation property that allows a high grip force to be exhibited. Therefore, in a case where rubber having a low-heat-generation property is used in a tread, for example, braking performance (hereinafter, also referred to as wet performance) on a wet road surface is degraded. It is difficult to obtain good balance between rolling resistance and wet performance Various studies have been made in order to achieve reduction of rolling resistance and enhancement of wet performance (for example, see Japanese Laid-Open Patent Publication No. 2018-2008).

Rolling resistance of a tire is required to be further reduced in consideration of influence on the environment. As described above, if a proportion of rubber having a low-heat-generation property in a tread is increased in order to reduce rolling resistance, wet performance is degraded. Rubber having a low-heat-generation property is weak. Therefore, if a proportion of rubber having a low-heat-generation property in a tread is increased, durability may be reduced. A technique for allowing rolling resistance to be reduced while maintaining good wet performance and good durability is required to be established.

The present disclosure has been made in view of such circumstances, and an object of the present disclosure is to provide a tire that allows rolling resistance to be reduced while maintaining good wet performance and good durability.

SUMMARY

A tire according to one aspect of the present disclosure includes a tread configured to come into contact with a road surface. The tread includes a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C. The intermediate layer is disposed outwardly of the base layer in a radial direction, and the cap layer is disposed outwardly of the intermediate layer in the radial direction. An outer end of the intermediate layer is disposed outwardly of an outer end of the base layer in an axial direction, and an outer end of the cap layer is disposed inwardly of the outer end of the intermediate layer in the axial direction. A difference between an axial width of the cap layer and an axial width of the base layer is not less than −10 mm and not greater than 10 mm.

DESCRIPTION OF THE PREFERRED EMBODIMENTS

Figure 1:
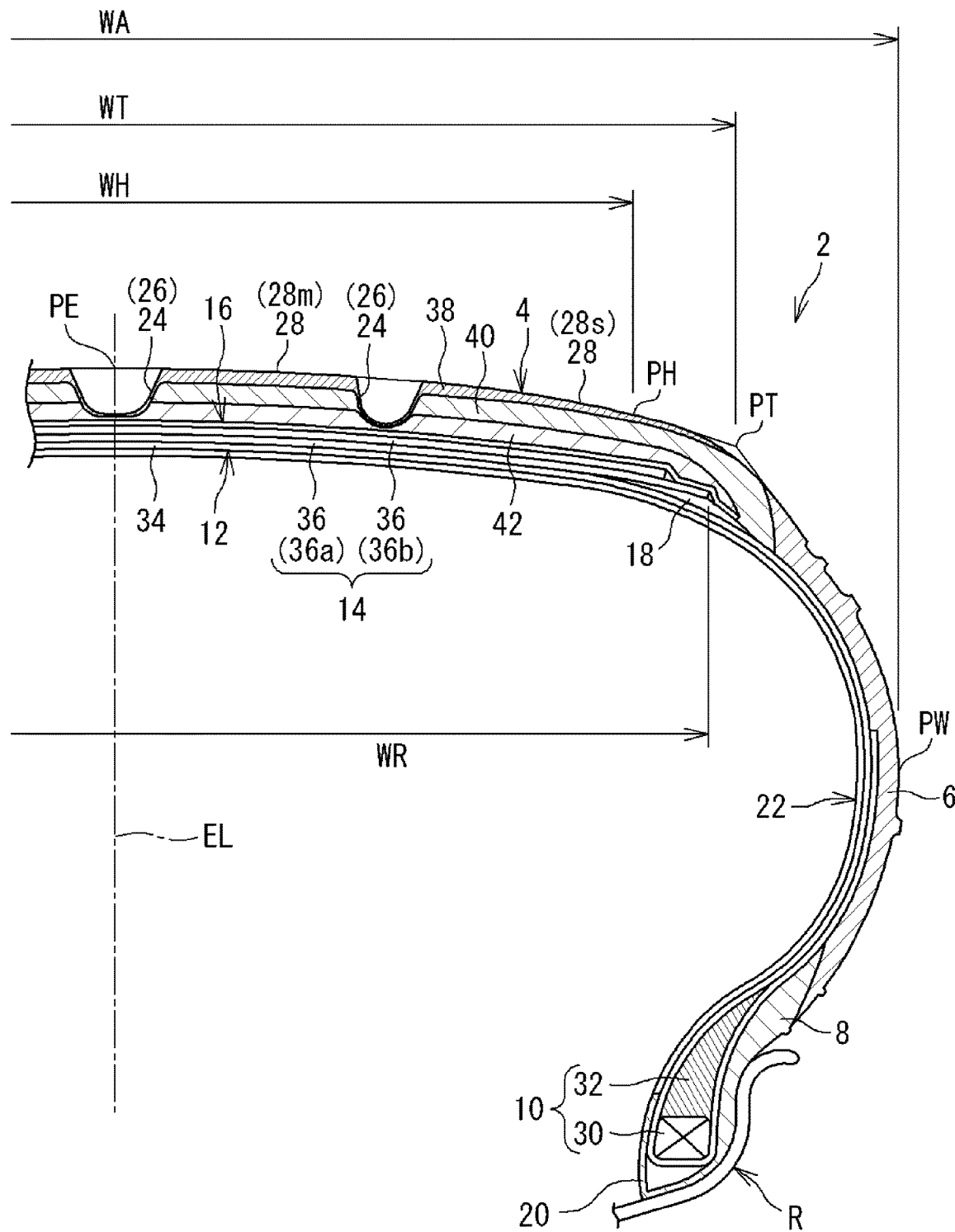
FIG. 1 is a cross-sectional view of a part of a tire according to one embodiment of the present disclosure.

The present disclosure will be described below in detail based on a preferred embodiment with appropriate reference to the drawings.

In the present disclosure, a state where a tire is mounted on a normal rim, an internal pressure of the tire is adjusted to a normal internal pressure, and no load is applied to the tire is referred to as a normal state. A state where a tire is mounted on a normal rim, an internal pressure of the tire is adjusted to 230 kPa, and no load is applied to the tire is referred to as a standard state.

In the present disclosure, unless otherwise specified, dimensions and angles of components of the tire are measured in the normal state. In a case where dimensions and angles of components on a meridian cross-section of a tire cannot be measured in a state where the tire is mounted on a normal rim, the dimensions and angles are measured by conforming a distance between left and right beads to a distance between beads of a tire mounted on a normal rim, on a cross-section of the tire which is obtained by cutting the tire along a plane including a rotation axis.

The normal rim represents a rim defined by a standard on which the tire is based. Examples of the normal rim include the "standard rim" in the JATMA standard, the "Design Rim" in the TRA standard, and the "Measuring Rim" in the ETRTO standard.

The normal internal pressure represents an internal pressure defined by a standard on which the tire is based. Examples of the normal internal pressure include the "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard.

The normal load represents a load defined by a standard on which the tire is based. Examples of the normal load include the "maximum load capacity" in the JATMA standard, the "maximum value" recited in "TIRE LOAD LIMITS AT VARIOUS COLD INFLATION PRESSURES" in the TRA standard, and the "LOAD CAPACITY" in the ETRTO standard.

In the present disclosure, crosslinked rubber refers to a molded product, of a rubber composition, obtained by pressurizing and heating the rubber composition. The rubber composition is uncrosslinked rubber obtained by mixing base rubber and chemicals in a kneading machine such as a Banbury mixer. The crosslinked rubber is also referred to as vulcanized rubber and the rubber composition is also referred to as unvulcanized rubber.

Examples of the base rubber include natural rubber (NR), butadiene rubber (BR), styrene-butadiene rubber (SBR), isoprene rubber (IR), ethylene-propylene rubber (EPDM), chloroprene rubber (CR), acrylonitrile butadiene rubber (NBR), and isobutylene-isoprene-rubber (IIR). Examples of the chemicals include a reinforcing agent such as carbon black and silica, a plasticizer such as aromatic oil, a filler such as zinc oxide, a lubricant such as stearic acid, an antioxidant, a processing aid, sulfur, and a vulcanization accelerator. Selection of the base rubber and the chemicals, contents of the selected chemicals, and the like are determined as appropriate according to the specifications of the component, such as a tread and sidewalls, to which the rubber composition is applied.

In the present disclosure, a loss tangent (also referred to as tans), at a temperature of 30° C., of a component formed of the crosslinked rubber among components of the tire is measured by using a viscoelasticity spectrometer ("VES" manufactured by Iwamoto Seisakusho) under the following conditions in accordance with the standard of JIS K6394.
Initial strain=10%
Dynamic strain=2%
Frequency=10 Hz
Deformation mode=tension In this measurement, a test piece is sampled from the tire. In a case where a test piece cannot be sampled from the tire, a test piece is sampled from sheet-shaped crosslinked rubber (hereinafter, also referred to as rubber sheet) obtained by pressurizing and heating a rubber composition used for forming a component to be measured, at a temperature of 170° C., for 12 minutes.

FIG. 1 shows a part of a tire 2 according to one embodiment of the present disclosure. The tire 2 is for a passenger car. FIG. 1 shows a part of a cross-section (hereinafter, also referred to as a meridian cross-section) of the tire 2 taken along a plane including the rotation axis of the tire 2. In FIG. 1, the left-right direction represents an axial direction of the tire 2, and the up-down direction represents a radial direction of the tire 2. The direction perpendicular to the surface of the drawing sheet in FIG. 1 represents a circumferential direction of the tire 2.

In FIG. 1, an alternate long and short dash line EL represents an equator plane of the tire 2. The tire 2 has a shape that is symmetric about the equator plane except for a tread pattern and decorative portions such as patterns and characters formed at the outer surface.

In FIG. 1, the tire 2 is mounted on a rim R. The rim R is a normal rim. The inside of the tire 2 is inflated with air to adjust an internal pressure of the tire 2. The tire 2 mounted on the rim R is also referred to as a tire-rim complex. The tire-rim complex includes the rim R and the tire 2 mounted on the rim R.

In FIG. 1, a position represented by reference character PW is an outer end of the tire 2 in the axial direction. In a case where a decorative portion such as a pattern or a character is on the outer surface, the outer end PW is specified based on an imaginary outer surface obtained on the assumption that no decorative portion is provided.

In FIG. 1, a length represented by reference character WA is the maximal width, that is, a cross-sectional width (see JATMA or the like) of the tire 2. The cross-sectional width WA of the tire 2 represents a distance in the axial direction from one of the outer ends PW to the other of the outer ends PW. The outer end PW represents a position (hereinafter, referred to as maximal width position) at which the tire 2 has the maximal width. The cross-sectional width WA is measured in the tire 2 in the standard state.

The tire 2 includes a tread 4, a pair of sidewalls 6, a pair of clinches 8, a pair of beads 10, a carcass 12, a belt 14, a band 16, a pair of cushions 18, a pair of chafers 20, and an inner liner 22.

The tread 4 comes into contact with a road surface at the outer surface of the tread 4. The tread 4 has grooves 24. Thus, a tread pattern is formed.

The tread 4 has at least three circumferential grooves 26 continuously extending in the circumferential direction, and at least four land portions 28 are formed to be aligned in the axial direction. In the tire 2, as shown in FIG. 1, the three circumferential grooves 26 are formed in the tread 4 and the four land portions 28 are formed in the tread 4. The circumferential grooves 26 form a part of the grooves 24 forming a tread pattern. In the four land portions 28, the land portions 28 disposed on the equator plane side are middle land portions 28m, and the land portions 28 disposed outwardly of the middle land portions 28m are shoulder land portions 28s.

In FIG. 1, a position represented by reference character PE represents the equator of the tire 2. The equator PE is an intersection point of the outer surface of the tread 4 and the equator plane. As shown in FIG. 1, in a case where the groove 24 is formed at the equator plane, the equator PE is specified based on an imaginary outer surface of the tread 4 obtained on the assumption that the groove 24 is not provided.

Each sidewall 6 is continuous with the end of the tread 4. The sidewall 6 is disposed inwardly of the tread 4 in the radial direction. The sidewall 6 extends along the carcass 12 from the end of the tread 4 toward the clinch 8. The sidewall 6 is formed of crosslinked rubber produced in consideration of cut resistance.

Each clinch 8 is disposed inwardly of the sidewall 6 in the radial direction. The clinch 8 comes into contact with the rim R. The clinch 8 is formed of crosslinked rubber produced in consideration of wear resistance.

Each bead 10 is disposed inwardly of the clinch 8 in the axial direction. The bead 10 includes a core 30 and an apex 32. The core 30 includes a steel wire which is not shown.

The apex 32 is disposed outwardly of the core 30 in the radial direction The apex 32 is tapered outwardly. The apex 32 is formed of crosslinked rubber having a high stiffness.

The carcass 12 is disposed inwardly of the tread 4, the pair of sidewalls 6, and the pair of clinches 8. The carcass 12 extends on and between one of the beads 10 and the other of the beads 10. The carcass 12 has a radial structure.

The carcass 12 includes at least one carcass ply 34. The carcass 12 of the tire 2 is formed of one carcass ply 34 from the viewpoint of weight reduction.

The carcass ply 34 includes multiple carcass cords aligned with each other, which are not shown. The carcass cords are covered with topping rubber. Each of the carcass cords intersects the equator plane. The carcass cord is formed of an organic fiber. Examples of the organic fiber include nylon fibers, rayon fibers, polyester fibers, and aramid fibers.

The belt 14 is disposed inwardly of the tread 4 in the radial direction. The belt 14 is stacked on the carcass 12 from the outer side in the radial direction. In FIG. 1, a length represented by reference character WR is a width of the belt 14 in the axial direction. The axial width WR represents a distance in the axial direction from one end of the belt 14 to the other end of the belt 14. In the tire 2, the axial width WR of the belt 14 is not less than 65% of the cross-sectional width WA and not greater than 85% thereof.

The belt 14 includes at least two layers 36 stacked in the radial direction. In the tire 2, the belt 14 includes two layers 36 stacked in the radial direction. In the two layers 36, the layer 36 disposed on the inner side is an inner layer 36a, and the layer 36 disposed on the outer side is an outer layer 36b. As shown in FIG. 1, the inner layer 36a is wider than the outer layer 36b. A length from the end of the outer layer 36b to the end of the inner layer 36a is not less than 3 mm and not greater than 10 mm.

Each of the inner layer 36a and the outer layer 36b includes multiple belt cords aligned with each other, which are not shown. The belt cords are covered with topping rubber. Each of the belt cords is inclined relative to the equator plane. The material of the belt cords is steel.

The band 16 is disposed between the tread 4 and the belt 14 in the radial direction. The band 16 is stacked on the belt 14 in a portion inward of the tread 4.

The band 16 includes a helically wound band cord which is not shown. The band cord extends substantially in the circumferential direction. Specifically, an angle of the band cord relative to the circumferential direction is not greater than 5°. The band 16 has a jointless structure. In the tire 2, a cord formed of an organic fiber is used as the band cord. Examples of the organic fiber include nylon fibers, rayon fibers, polyester fibers, and aramid fibers.

In the tire 2, the band 16 is formed as a full band in which both ends oppose each other across the equator PE. The band 16 is wider than the belt 14. A length from the end of the belt 14 to the end of the band 16 is not less than 3 mm and not greater than 10 mm. The band 16 covers the entirety of the belt 14. The band 16 may include a pair of edge bands that are spaced from each other in the axial direction and cover the ends of the full band and the ends of the belt 14. The band 16 may be formed as the pair of edge bands only.

The cushions 18 are spaced from each other in the axial direction. Each cushion 18 is disposed between a ply body 34a of the carcass 12, and the end of the belt 14 and the end of the band 16. The cushion 18 is formed of crosslinked rubber having a low stiffness. In the tire 2, the cushion 18 may not necessarily be provided.

Each chafer 20 is disposed inwardly of the bead 10 in the radial direction. The chafer 20 comes into contact with the rim R. In the tire 2, the chafer 20 is formed of fabric and rubber impregnated in the fabric.

The inner liner 22 is disposed inwardly of the carcass 12. The inner liner 22 forms an inner surface of the tire 2. The inner liner 22 is formed of crosslinked rubber having a low gas permeation coefficient. The inner liner 22 retains an internal pressure of the tire 2.

In FIG. 1, a position represented by reference character PH is a position on the outer surface of the tread 4. The position PH corresponds to an axially outer end of a ground contact surface at which the tire 2 is in contact with a road surface.

The ground contact surface for specifying the position PH is obtained by using, for example, a ground contact surface shape measuring device (not shown). The ground contact surface is obtained by the device in a manner in which, in a state where a camber angle of the tire 2 in the standard state is 0°, a load that is 70% of the normal load is applied as a vertical load to the tire 2, and the tire 2 is brought into contact with a planar road surface. In the tire 2, the ground contact surface obtained in this manner is a reference ground contact surface, and a position, on the outer surface of the tread 4, corresponding to the axially outer end of the reference ground contact surface is the above-described position PH. In the tire 2, the position PH is a reference ground contact end.

Figure 2:
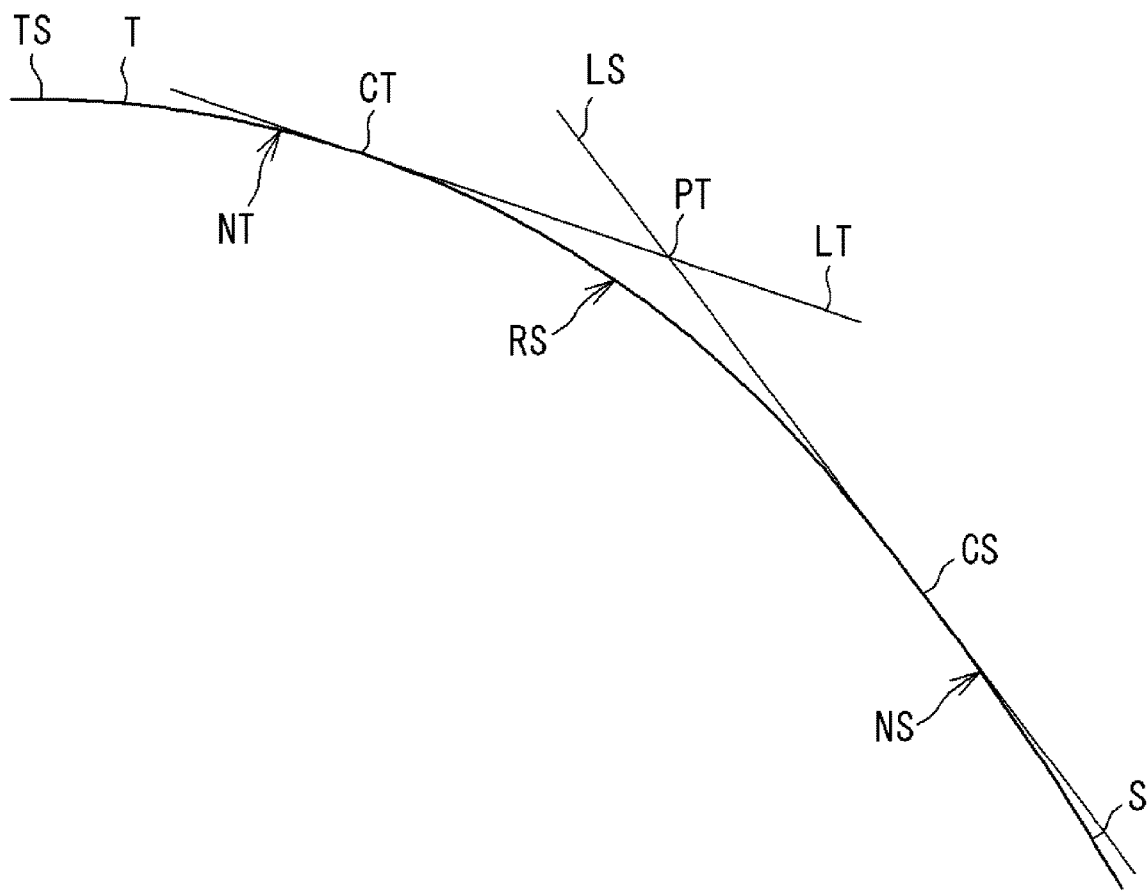
FIG. 2 is an enlarged cross-sectional view of a contour of a shoulder portion of the tire in FIG. 1.

FIG. 2 shows a part of the tire 2 in FIG. 1. In FIG. 2, the left-right direction represents the axial direction of the tire 2 and the up-down direction represents the radial direction of the tire 2. The direction perpendicular to the surface of the drawing sheet in FIG. 2 represents the circumferential direction of the tire 2.

FIG. 2 shows a contour of a shoulder portion of the tire 2 on the meridian cross-section. The contour shown in FIG. 2 is obtained by measuring the outer surface shape of the tire 2 in the standard state by a displacement sensor.

On the meridian cross-section, the contour of the outer surface (hereinafter, referred to as tire outer surface TS) of the tire 2 is formed by connecting a plurality of contour lines each formed as a straight line or an arc. In the present disclosure, the contour line formed as a straight line or an arc is simply referred to as a contour line. The contour line formed as the straight line is referred to as a straight contour line, and the contour line formed as an arc is referred to as a curved contour line.

The tire outer surface TS includes a tread surface T and a pair of side surfaces S continuous with the ends of the tread surface T. On the meridian cross-section, the contour of the tread surface T includes a plurality of curved contour lines having different radii. In the tire 2, in the plurality of curved contour lines included in the contour of the tread surface T, a curved contour line having the smallest radius is disposed at the end portion of the tread surface T and is connected to the side surface S. On the meridian cross-section, the contour of the tire outer surface TS includes, on each end portion of the tread surface, a curved line portion that is a curved contour line connected to the side surface and formed as an arc having the smallest radius among the plurality of curved contour lines included in the contour of the tread surface. In FIG. 2, the curved line portion is represented by reference character RS.

On the contour of the tire outer surface TS, the curved line portion RS is in contact with a contour line (hereinafter, referred to as inner adjacent contour line NT) adjacent to the curve line portion RS on the inner side in the axial direction, at a contact point CT. The curved line portion RS is in contact with a contour line (hereinafter, referred to as outer adjacent contour line NS), forming a contour of the side surface S, adjacent to the curve line portion RS on the outer side in the axial direction, at a contact point CS. The contour of the tire outer surface TS includes the inner adjacent contour line NT that is disposed inwardly of the curved line portion RS in the axial direction and is in contact with the curved line portion RS, and the outer adjacent contour line NS that is disposed outwardly of the curved line portion RS in the axial direction and is in contact with the curved line portion RS.

In FIG. 2, a solid line LT is a line tangent to the curved line portion RS at the contact point CT at which the inner adjacent contour line NT and the curved line portion RS are in contact with each other. A solid line LS is a line tangent to the curved line portion RS at the contact point CS at which the outer adjacent contour line NS and the curved line portion RS are in contact with each other. A position represented by reference character PT is an intersection point of the tangent line LT and the tangent line LS. In the tire 2, the intersection point PT represents an imaginary tread end.

A portion of the tread 4 from one of the imaginary tread ends PT to the other of the imaginary tread ends PT is a region (hereinafter, also referred to as normal ground contact region) that is to come into contact with a road surface in a typical running condition of the tire 2. From the viewpoint of effectively reinforcing the tread 4 portion (hereinafter, also referred to as tread portion), the belt 14 and the band 16 described above are disposed in the normal ground contact region.

In FIG. 1, a length represented by a double-headed arrow WT is a width of the tread 4. The width of the tread 4 represents a distance in the axial direction from one of the imaginary tread ends PT to the other of the imaginary tread ends PT. A length represented by a double-headed arrow WH is a width of the reference ground contact surface in the axial direction. The axial width WH represents a distance in the axial direction from one of the reference ground contact ends PH to the other of the reference ground contact ends PH.

In the tire 2, a ratio (WT/WA) of the width WT of the tread 4 to the cross-sectional width WA is not less than 70% and not greater than 90%. The imaginary tread end PT is disposed outwardly of the reference ground contact end PH in the axial direction. In other words, the axial width WH of the reference ground contact surface is less than the width WT of the tread 4. Specifically, a ratio (WH/WT) of the axial width WH to the width WT of the tread 4 is not less than 70% and not greater than 90%.

Figure 3:
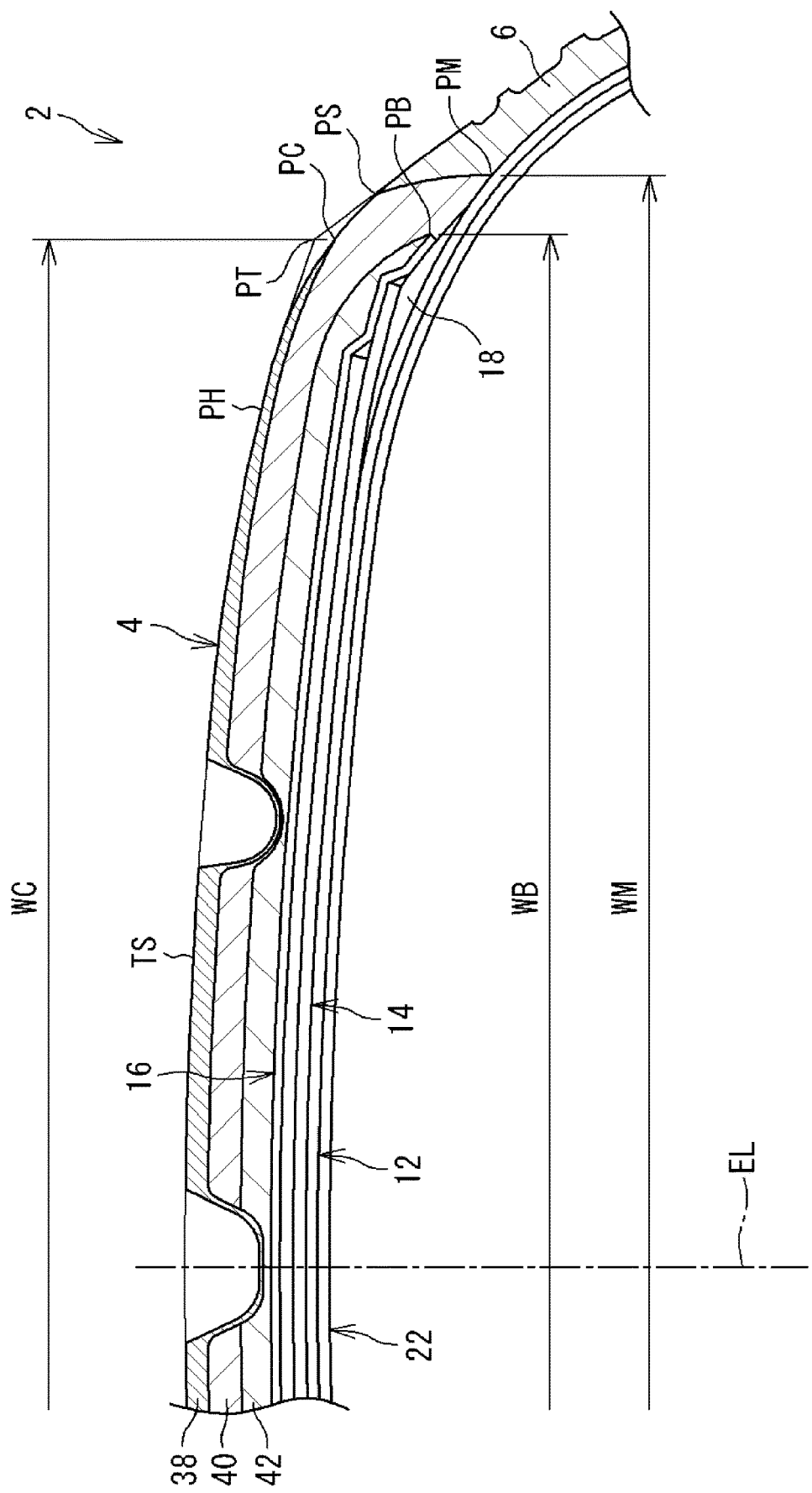
FIG. 3 is an enlarged cross-sectional view of a part of the tire in FIG. 1.

FIG. 3 shows a part of the tire 2 in FIG. 1. FIG. 3 shows a tread portion of the tire 2. In FIG. 3, the left-right direction represents the axial direction of the tire 2 and the up-down direction represents the radial direction of the tire 2. The direction perpendicular to the surface of the drawing sheet in FIG. 3 represents the circumferential direction of the tire 2.

In the tire 2, the tread 4 includes a cap layer 38, an intermediate layer 40, and a base layer 42. In the radial direction, the intermediate layer 40 is disposed outwardly of the base layer 42, and the cap layer 38 is disposed outwardly of the intermediate layer 40. As shown in FIG. 3, the cap layer 38 is stacked on the intermediate layer 40 and the intermediate layer 40 is stacked on the base layer 42.

In the tire 2, at the center of the land portion 28 in the width direction, a ratio of a thickness of the cap layer 38 to a thickness of the tread 4 is preferably not less than 10% and not greater than 40%. At the center of the land portion 28 in the width direction, a ratio of a thickness of the intermediate layer 40 to the thickness of the tread 4 is not less than 30% and not greater than 70%.

In FIG. 3, a position represented by reference character PC is the outer end of the cap layer 38. A length represented by reference character WC is an axial width of the cap layer 38. The axial width WC represents a distance in the axial direction from one of the outer ends PC to the other of the outer ends PC. A position represented by reference character PM is the outer end of the intermediate layer 40. A length represented by reference character WM is the axial width of the intermediate layer 40. The axial width WM represents a distance in the axial direction from one of the outer ends PM to the other of the outer ends PM. A position represented by reference character PB is the outer end of the base layer 42. A length represented by reference character WB is the axial width of the base layer 42. The axial width WB represents a distance in the axial direction from one of the outer ends PB to the other of the outer ends PB.

In FIG. 3, a position represented by reference character PS is the outer end of the tread 4 on the tire outer surface TS. In the tire 2, the outer end PS of the tread 4 is disposed outwardly of the outer end PC of the cap layer 38 in the axial direction. A portion of the tire outer surface TS from the outer end PC to the outer end PS is formed by the intermediate layer 40. In the tire 2, a part of the intermediate layer 40 is exposed at the tire outer surface TS.

The cap layer 38, the intermediate layer 40, and the base layer 42 are formed of crosslinked rubbers having different heat generation properties, respectively. In the tire 2, the cap layer 38 is most likely to generate heat and the base layer 42 is least likely to generate heat. The intermediate layer 40 has a heat generation property that is between the heat generation property of the cap layer 38 and the heat generation property of the base layer 42. In the tire 2, a loss tangent LTm of the intermediate layer 40 at 30° C. is less than a loss tangent LTc of the cap layer 38 at 30° C. A loss tangent LTb of the base layer 42 at 30° C. is less than the loss tangent LTm of the intermediate layer 40 at 30° C.

The loss tangent LTb of the base layer 42 at 30° C. is preferably not greater than 0.11. Thus, the base layer 42 effectively contributes to reduction of rolling resistance. From this viewpoint, the loss tangent LTb is more preferably not greater than 0.10 and even more preferably not greater than 0.09. The less the loss tangent LTb of the base layer 42 is, the better the effect is. Therefore, a preferable lower limit is not set.

The loss tangent LTm of the intermediate layer 40 at 30° C. is preferably not greater than 0.15. Thus, the intermediate layer 40 effectively contributes to reduction of rolling resistance. From this viewpoint, the loss tangent LTm is more preferably not greater than 0.14 and even more preferably not greater than 0.13. The loss tangent LTm of the intermediate layer 40 at 30° C. is preferably not less than 0.11. Thus, the intermediate layer 40 can assuredly have required stiffness and can effectively contribute to enhancement of wet performance From this viewpoint, the loss tangent LTm is more preferably not less than 0.12.

The loss tangent LTc of the cap layer 38 at 30° C. is preferably not less than 0.15. Thus, the cap layer 38 can contribute to enhancement of wet performance. From this viewpoint, the loss tangent LTc is more preferably not less than 0.16 and even more preferably not less than 0.17. The cap layer 38 comes into contact with a road surface. From the viewpoint of enhancing wet performance, the greater the loss tangent LTc is, the better the effect is. However, in a case where the loss tangent LTc is great, heat generation is caused, and the cap layer 38 having generated heat may cause the temperature of the intermediate layer 40 to become higher than expected. From the viewpoint that the temperature of the entirety of the tread 4 is maintained stable and low rolling resistance can be maintained, the loss tangent LTc of the cap layer 38 at 30° C. is preferably not greater than 0.30, more preferably not greater than 0.28, and even more preferably not greater than 0.27.

In the tire 2, the outer end PM of the intermediate layer 40 is disposed outwardly of the outer end PB of the base layer 42 in the axial direction. A boundary between the intermediate layer 40 and the sidewall 6 extends on and between the tire outer surface TS and the outer surface of the carcass 12. The boundary is disposed outwardly of the base layer 42 in the axial direction. In the tire 2, the intermediate layer 40 is disposed between the base layer 42 and the sidewall 6. The intermediate layer 40 covers the base layer 42 from the radially outer side and the axially outer side.

If a vehicle runs under a harsh condition in which a high inertial force is generated, a boundary portion (hereinafter, also referred to as a buttress portion) between the tread 4 and the sidewall 6 is worn. In the tire 2, the intermediate layer 40 having a sufficient thickness is disposed between the tire outer surface TS and the base layer 42. Therefore, even when the tire 2 is used in limit run in which the buttress portion may be worn, the base layer 42 is prevented from being exposed. In the tire 2, good durability is maintained.

In the tire 2, the outer end PC of the cap layer 38 is disposed inwardly of the outer end PM of the intermediate layer 40 in the axial direction. In other words, the cap layer 38 covers a part of the intermediate layer 40 instead of the entirety of the intermediate layer 40. In the tire 2, a volume of the cap layer 38 which causes increase of rolling resistance is reduced and a volume of the intermediate layer 40 which contributes to reduction of rolling resistance is increased, as compared with the tread 4 in which the entirety of the intermediate layer 40 is covered by the cap layer 38. The tread 4 contributes to reduction of rolling resistance.

In the tire 2, a difference (WC−WB) between the axial width WC of the cap layer 38 and the axial width WB of the base layer 42 is not less than −10 mm and not greater than 10 mm. The axial width WC of the cap layer 38 is almost equal to the axial width WB of the base layer 42. Since the tread 4 has, as a whole, a good balance between a heat generation property and stiffness, the cap layer 38 can effectively contribute to enhancement of wet performance, and the base layer 42 can effectively contribute to reduction of rolling resistance. From this viewpoint, the difference (WC−WB) is preferably not less than −5 mm and preferably not greater than 5 mm.

In the tire 2, the outer end PM of the intermediate layer 40 is disposed outwardly of the outer end PB of the base layer 42 in the axial direction, and the outer end PC of the cap layer 38 is disposed inwardly of the outer end PM of the intermediate layer 40. A difference (WC−WB) between the axial width WC of the cap layer 38 and the axial width WB of the base layer 42 is not less than −10 mm and not greater than 10 mm. The tire 2 allows rolling resistance to be reduced while maintaining good wet performance and good durability.

In the tire 2, a portion, of the tread 4, formed of the cap layer 38 and the intermediate layer 40 corresponds to a cap layer of a tread which is formed of the cap layer and a base layer in a conventional tire. In the tire 2, from the viewpoint that the tread 4 can effectively contribute to enhancement of wet performance and reduction of rolling resistance, a ratio (LTc/LTm) of the loss tangent LTc of the cap layer 38 at 30° C. to the loss tangent LTm of the intermediate layer 40 at 30° C. is preferably not less than 110% and not greater than 250%. The ratio (LTc/LTm) is more preferably not less than 130% and even more preferably not less than 150%. The ratio (LTc/LTm) is more preferably not greater than 240% and even more preferably not greater than 230%.

In the tire 2, from the viewpoint that the cap layer 38 can effectively contribute to exhibition of wet performance, a ratio (WC/WA) of the axial width WC of the cap layer 38 to the cross-sectional width WA of the tire 2 is preferably not less than 70% and more preferably not less than 75%. From the viewpoint of effectively reducing influence of the cap layer 38 on rolling resistance, the ratio (WC/WA) is preferably not greater than 90% and more preferably not greater than 85%.

In the tire 2, from the viewpoint of reducing rolling resistance, a difference (WM−WC) between the axial width WM of the intermediate layer 40 and the axial width WC of the cap layer 38 is preferably not greater than 30 mm, more preferably not greater than 20 mm, and even more preferably not greater than 10 mm. From the viewpoint that the intermediate layer 40 can effectively contribute to prevention of exposure of the base layer 42 during limit run, the difference (WM−WC) is preferably not less than 10 mm. In the tire 2, from the viewpoint of effectively reducing rolling resistance while exposure of the base layer 42 is prevented, the difference (WM−WC) is particularly preferably 10 mm.

In the tire 2, a difference (WB−WT) between the axial width WB of the base layer 42 and the width WT of the tread 4 is preferably not less than −10 mm and not greater than 10 mm. In other words, the axial width WB of the base layer 42 is preferably almost equal to the width WT of the tread 4. Thus, the axial width WB of the base layer 42 and a distance from the tire outer surface TS to the base layer 42 are effectively ensured. In the tire 2, exposure of the base layer 42 during limit run is effectively prevented, and, furthermore, a function of the base layer 42 for reducing rolling resistance is stably exhibited. In the tire 2, good durability and low rolling resistance are obtained. From this viewpoint, the difference (WB−WT) is more preferably not less than −5 mm and more preferably not greater than 5 mm.

As described above, in the tire 2, the outer end PM of the intermediate layer 40 is disposed outwardly of the outer end PB of the base layer 42 in the axial direction. From the viewpoint that exposure of the base layer 42 during limit run is effectively prevented and good durability is maintained, a difference (WM−WB) between the axial width WM of the intermediate layer 40 and the axial width WB of the base layer 42 is preferably not less than 6 mm and more preferably not less than 8 mm. From the viewpoint of ensuring the axial width WB of the base layer 42 and obtaining low rolling resistance, the difference (WM−WB) is preferably not greater than 14 mm and more preferably not greater than 12 mm.

A high load acts on the tire during braking. Thus, the ground contact width of the tire 2 tends to be increased. In the tire 2, the outer end PC of the cap layer 38 is disposed outwardly of the reference ground contact end PH in the axial direction. The cap layer 38 can come into sufficient contact with a road surface also during braking. In the tire 2, good wet performance is obtained. From this viewpoint, the outer end PC of the cap layer 38 is preferably disposed outwardly of the reference ground contact end PH in the axial direction.

In the tire 2, preferably, a difference (WC−WT) between the axial width WC of the cap layer 38 and the width WT of the tread 4 is not less than −10 mm and not greater than 10 mm. In other words, the axial width WC of the cap layer 38 is preferably almost equal to the width WT of the tread 4. Thus, the cap layer 38 can come into sufficient contact with a road surface during not only straight running but also braking in which a high load acts. In the tire 2, good wet performance is obtained. From this viewpoint, the difference (WC−WT) is preferably not less than −5 mm and preferably not greater than 5 mm.

As described above, a region represented by the width WT of the tread 4 is a normal ground contact region. In the normal ground contact region, the belt 14 and the band 16 are disposed in order to effectively reinforce the tread portion. The base layer 42 contributes to reduction of rolling resistance but has stiffness lower than stiffness of each of the cap layer 38 and the intermediate layer 40. In the tire 2, the base layer 42 is stacked on the band 16 and the band 16 is stacked on the belt 14. The base layer 42 is effectively reinforced by the belt 14 and the band 16. The base layer 42 can effectively contribute to reduction of rolling resistance. From this viewpoint, a position of the outer end PB of the base layer 42 preferably coincides with a position of the outer end of the band 16 in the axial direction, or the outer end PB of the base layer 42 is preferably disposed outwardly of the outer end of the band 16 in the axial direction. In other words, a length from the outer end of the band 16 to the outer end PB of the base layer 42 is preferably not less than 0 mm. From the viewpoint of effectively reinforcing the base layer 42 and preventing exposure of the base layer 42, the length is preferably not greater than 4 mm and more preferably not greater than 2 mm. In a case where the belt 14 is wider than the band 16, a length from the outer end of the belt 14 to the outer end PB of the base layer 42 is preferably not less than 0 mm from the viewpoint of reducing rolling resistance. From the viewpoint of effectively reinforcing the base layer 42 and preventing exposure of the base layer 42, the length is preferably not greater than 4 mm and more preferably not greater than 2 mm.

As described above, according to the present disclosure, the tire that allows rolling resistance to be reduced while maintaining good wet performance and good durability is obtained.

EXAMPLES

The present disclosure will be described below in more detail according to examples and the like. However, the present disclosure is not limited only to the examples.

Example 1

A pneumatic tire (tire size=205/55R16), for a passenger car, having the basic structure shown in FIG. 1 and the specifications indicated below in Table 1 was obtained.

A tread including a cap layer, an intermediate layer, and a base layer, and having the structure shown in FIG. 3 was used. The difference (WC−WB) between the axial width WC of the cap layer and the axial width WB of the base layer was 0 mm. The difference (WM−WC) between the axial width WM of the intermediate layer and the axial width WC of the cap layer was 10 mm. The difference (WM−WB) between the axial width WM of the intermediate layer and the axial width WB of the base layer was 10 mm. The difference (WM−WT) between the axial width WM of the intermediate layer and the width WT of the tread was 10 mm.

In example 1, the loss tangent LTc of the cap layer at 30° C. was 0.27. The loss tangent LTm of the intermediate layer at 30° C. was 0.12. The loss tangent LTb of the base layer at 30° C. was 0.10.

Comparative Example 1

Figure 4:
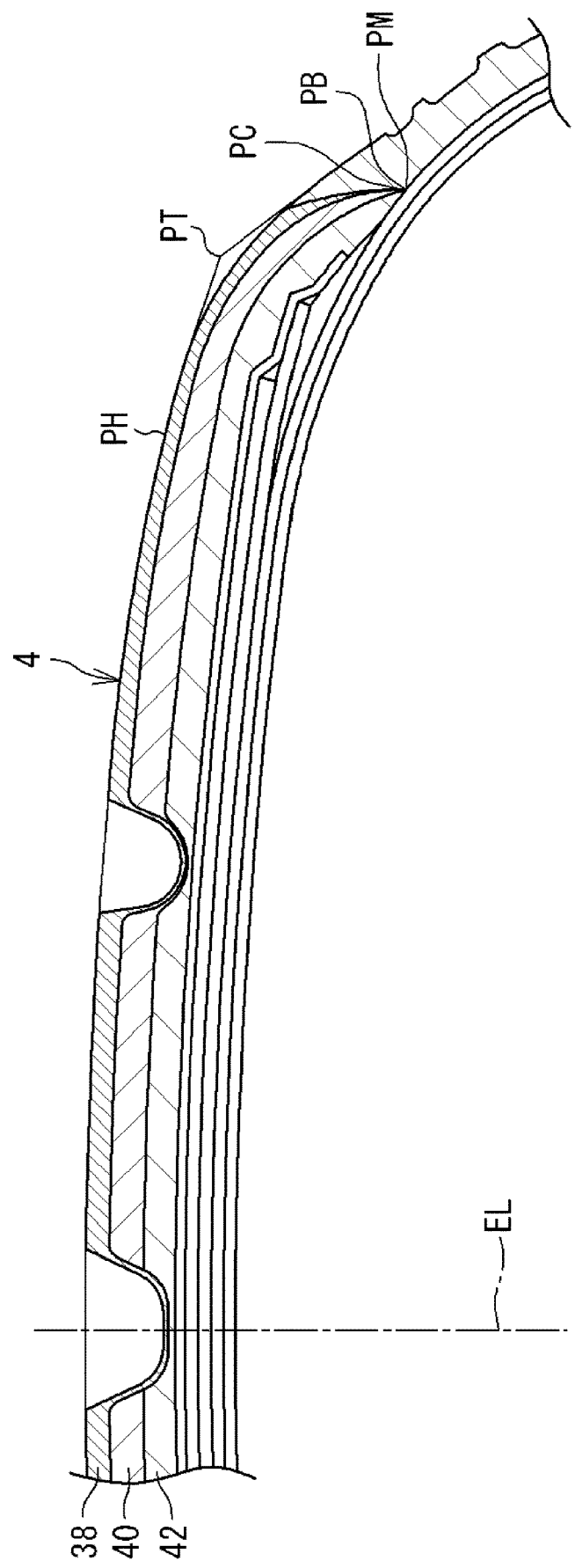
FIG. 4 is an enlarged cross-sectional view of a part of a tire of comparative example 1.

A tire of comparative example 1 was obtained in the same manner as in example 1 except that the structure of the tread was the structure shown in FIG. 4, and the difference (WM−WC) and the difference (WM−WB) were as indicated below in Table 1.

Comparative Example 2

Figure 5:
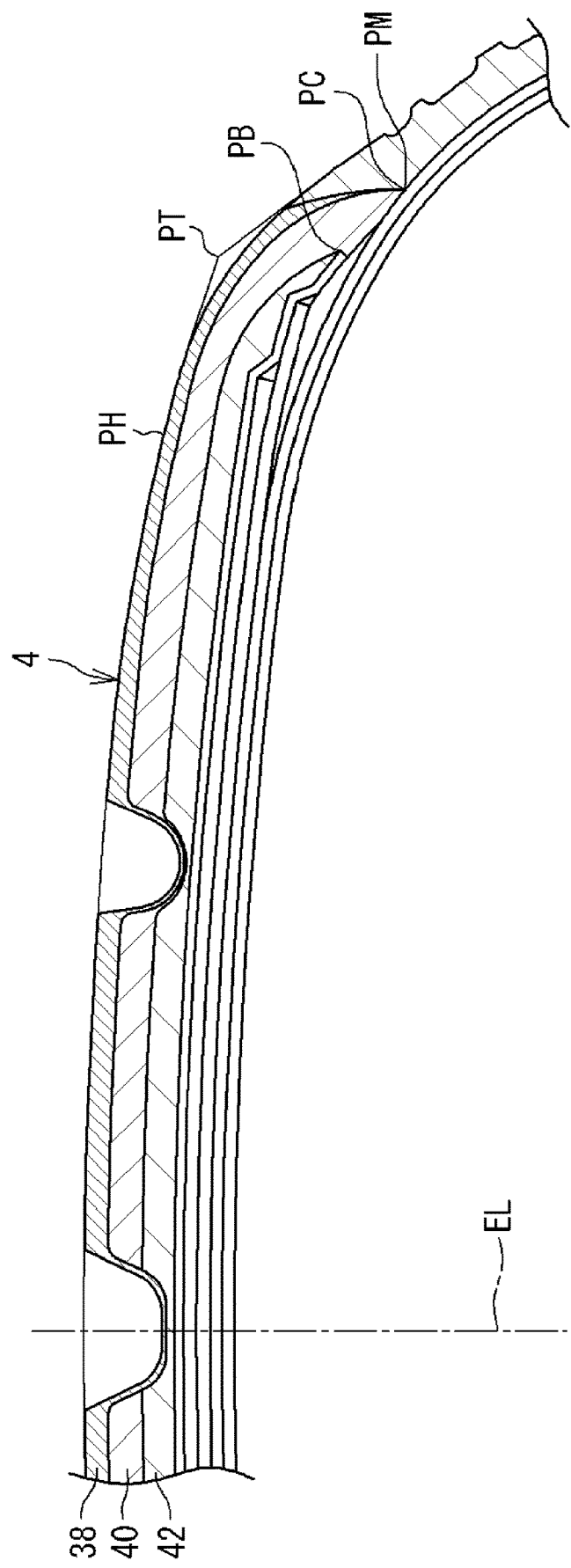
FIG. 5 is an enlarged cross-sectional view of a part of a tire of comparative example 2.

A tire of comparative example 2 was obtained in the same manner as in example 1 except that the structure of the tread was the structure shown in FIG. 5, and the difference (WC−WB) and the difference (WM−WC) were as indicated below in Table 1.

Comparative Example 3

Figure 6:
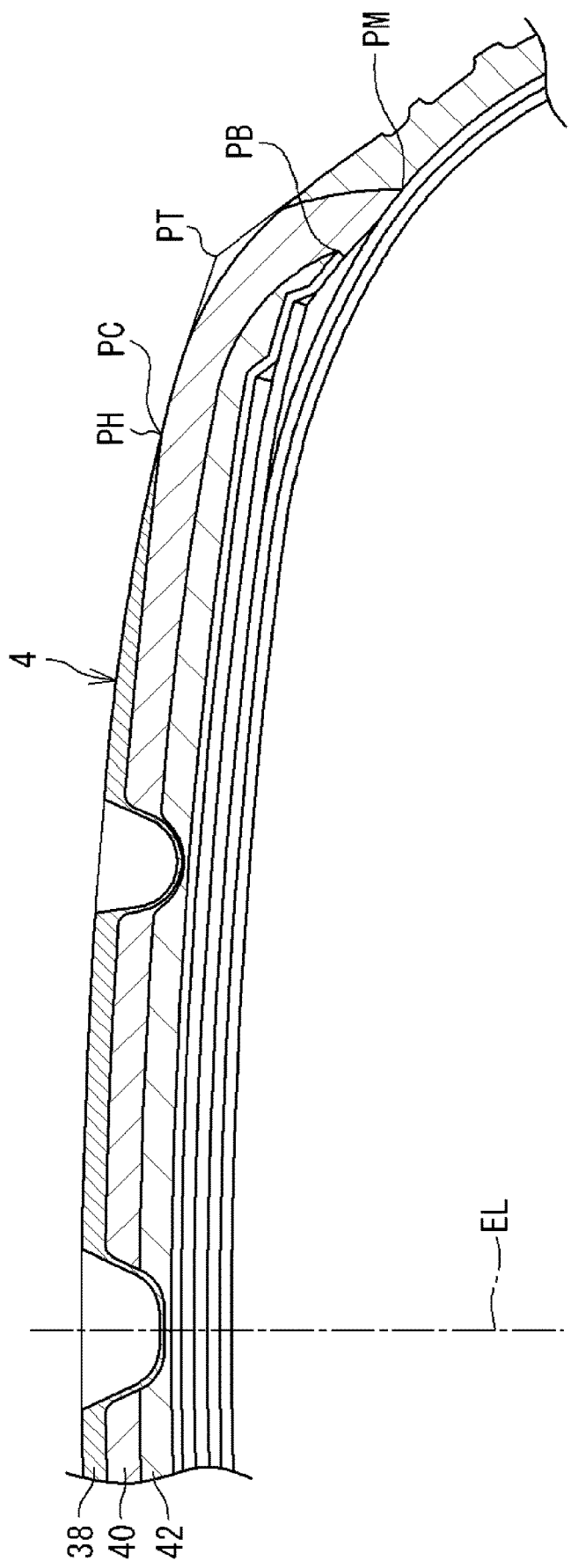
FIG. 6 is an enlarged cross-sectional view of a part of a tire of comparative example 3.

A tire of comparative example 3 was obtained in the same manner as in example 1 except that the structure of the tread was the structure shown in FIG. 6, and the difference (WC−WB) and the difference (WM−WC) were as indicated below in Table 1.

Comparative Example 4

Figure 7:
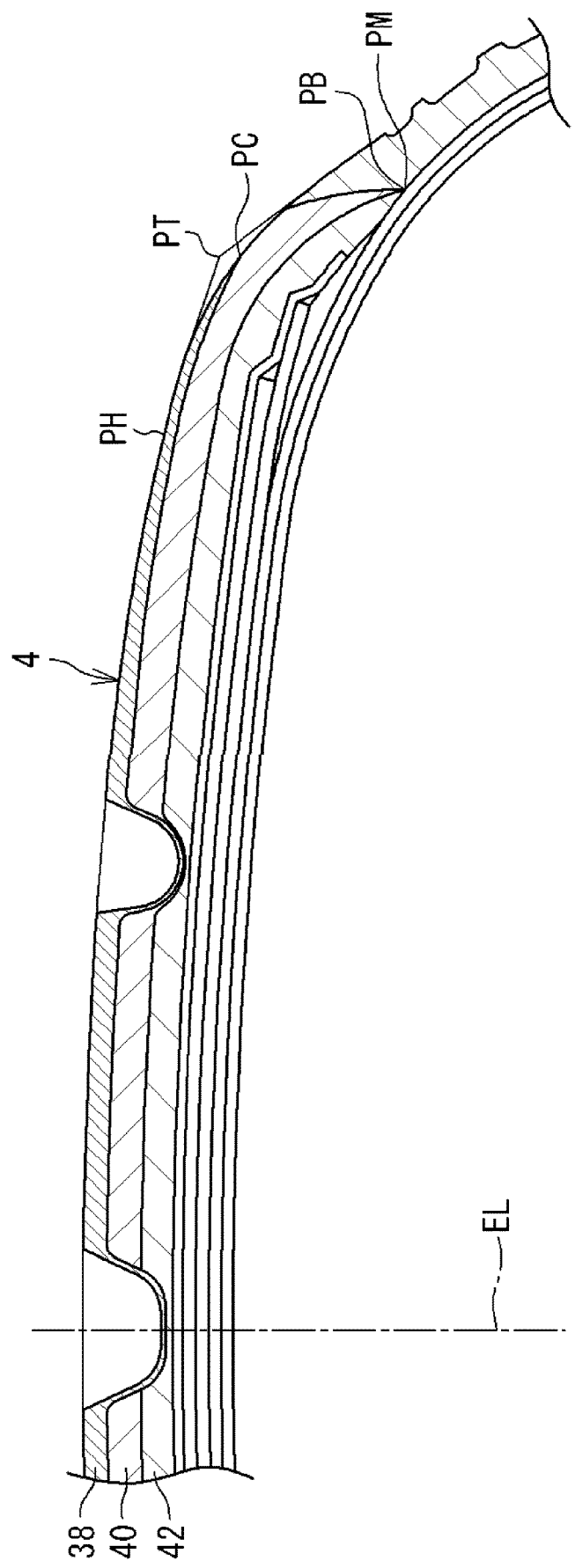
FIG. 7 is an enlarged cross-sectional view of a part of a tire of comparative example 4.

A tire of comparative example 4 was obtained in the same manner as in example 1 except that the structure of the tread was the structure shown in FIG. 7, and the difference (WC−WB) and the difference (WM−WB) were as indicated below in Table 1.

Rolling Resistance Coefficient (RRC)

A rolling resistance coefficient (RRC) was measured by using a rolling resistance testing machine when running with the test tire on a drum under the following conditions was performed at a speed of 80 km/h. The results are indicated below as indexes in Table 1. The less the value is, the lower rolling resistance of the tire is.
Rim: 16×6.5J
Internal pressure: 210 kPa
Vertical load: 4.82 kN

Wet Performance (WET)

A test tire was mounted on a rim (size=16×6.5J) and was inflated with air to adjust an internal pressure of the tire to 230 kPa. The tire was mounted to a test vehicle (passenger car). The test vehicle was caused to run on a wet road surface (water film thickness=1.4 mm) in a test course. The test vehicle was braked in a state where the test vehicle was running at a speed of 100 km/h, and a running distance (braking distance) from a time when the vehicle was braked to a time when the vehicle stopped was measured. The results are indicated below as indexes in Table 1. The greater the value is, the less the braking distance is and the more excellent wet performance of the tire is.

Limit Performance

A test tire was mounted on a rim (size=16×6.5J) and was inflated with air to adjust an internal pressure of the tire to 230 kPa. The tire was mounted to a test vehicle (passenger car). The test vehicle was caused to perform cornering in an understeer state on a dry road surface in a circular test course. The running speed was set to 100 km/h. After running 20 laps, a worn state was checked at the buttress portion of the tire. The results are indicated below in Table 1. "NG" represents a case where exposure of the base layer or separation of the tread was confirmed. "G" represents a case where exposure of the base layer and separation of the tread were not confirmed.

TABLE 1

| Structure | Comp. Ex. 1 FIG. 4 | Comp. Ex. 2 FIG. 5 | Ex. 1 FIG. 3 | Comp. Ex. 3 FIG. 6 | Comp. Ex. 4 FIG. 7 |
|---|---|---|---|---|---|
| WC-WB [mm] | 0 | 10 | 0 | −30 | −10 |
| WM-WC [mm] | 0 | 0 | 10 | 40 | 10 |
| WM-WB [mm] | 0 | 10 | 10 | 10 | 0 |
| RRC | 100 | 105 | 94 | 91 | 91 |
| WET | 100 | 100 | 100 | 95 | 100 |
| Limit run | NG | G | G | G | NG |

As indicated in Table 1, in the example, it was confirmed that rolling resistance was reduced while good wet performance and good durability were maintained. The evaluation results clearly indicate that the technique in the present disclosure is superior.

The technique for allowing rolling resistance to be reduced while maintaining good wet performance and good durability as described above is also applicable to various tires.

Preferably, in the tire, a difference between an axial width of the intermediate layer and the axial width of the cap layer is not less than 10 mm and not greater than 30 mm.

Preferably, in the tire, a difference between the axial width of the base layer and a width of the tread is not less than −10 mm and not greater than 10 mm.

Preferably, in the tire, a ground contact surface obtained by mounting the tire on a normal rim, adjusting an internal pressure of the tire to 230 kPa, applying a load that is 70% of a normal load, to the tire, as a vertical load, and bringing the tire into contact with a planar road surface is a reference ground contact surface, and a position, on an outer surface of the tire, corresponding to an outer end of the reference ground contact surface in the axial direction is a reference ground contact end. The outer end of the cap layer is preferably disposed outwardly of the reference ground contact end in the axial direction.

Preferably, in the tire, a ratio of the loss tangent of the cap layer at 30° C. to the loss tangent of the intermediate layer at 30° C. is not less than 110% and not greater than 250%.

The tire preferably includes: a belt disposed inwardly of the tread in the radial direction; and a band disposed between the tread and the belt in the radial direction. The belt preferably includes multiple belt cords aligned with each other. The band preferably includes a helically wound band cord. The band is preferably wider than the belt. A position of the outer end of the base layer preferably coincides with a position of an outer end of the band in the axial direction, or the outer end of the base layer is preferably disposed outwardly of the outer end of the band in the axial direction.

Preferably, in the tire, a ratio of the axial width of the cap layer to a cross-sectional width of the tire is not less than 70% and not greater than 90%.

According to the present disclosure, the tire that allows rolling resistance to be reduced while maintaining good wet performance and good durability is obtained.

What is claimed is:

1. A tire comprising:
    a tread configured to come into contact with a road surface,
    wherein the tread comprises a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C.,
    wherein the intermediate layer is disposed outwardly of the base layer in a radial direction, and the cap layer is disposed outwardly of the intermediate layer in the radial direction,
    wherein an outer end of the intermediate layer is disposed outwardly of an outer end of the base layer in an axial direction, and an outer end of the cap layer is disposed inwardly of the outer end of the intermediate layer in the axial direction,
    wherein a difference between an axial width of the cap layer and an axial width of the base layer is not less than −10 mm and not greater than 10 mm,
    wherein an axial width of the intermediate layer is greater than the axial width of the cap layer,
    wherein the axial width of the intermediate layer is greater than the axial width of the base layer, and
    wherein, of the base layer, the intermediate layer, and the cap layer, only the intermediate layer contacts a pair of sidewalls of the tire.

2. The tire according to claim 1, wherein a difference between an axial width of the intermediate layer and the axial width of the cap layer is not less than 10 mm and not greater than 30 mm.

3. The tire according to claim 1, wherein a difference between the axial width of the base layer and a width of the tread is not less than −10 mm and not greater than 10 mm.

4. The tire according to claim 1,
    wherein the tire defines a reference ground contact surface, the reference ground contact surface of the tire being obtained when the tire is mounted on a normal rim, an internal pressure of the tire is adjusted to 230 kPa, a vertical load is applied to the tire that is 70% of a normal load, and the tire is brought into contact with a planar road surface, and a position, on an outer surface of the tire, corresponding to an outer end of the reference ground contact surface in the axial direction is a reference ground contact end, and
    wherein the outer end of the cap layer is disposed outwardly of the reference ground contact end in the axial direction.

5. The tire according to claim 1, wherein a ratio of the loss tangent of the cap layer at 30° C. to the loss tangent of the intermediate layer at 30° C. is not less than 110% and not greater than 250%.

6. The tire according to claim 1, comprising:
    a belt disposed inwardly of the tread in the radial direction; and
    a band disposed between the tread and the belt in the radial direction,
    wherein the belt comprises multiple belt cords aligned with each other,
    wherein the band comprises a helically wound band cord,
    wherein the band is wider than the belt, and
    wherein a position of the outer end of the base layer coincides with a position of an outer end of the band in the axial direction, or the outer end of the base layer is disposed outwardly of the outer end of the band in the axial direction.

7. The tire according to claim 1, wherein a ratio of the axial width of the cap layer to a cross-sectional width of the tire is not less than 70% and not greater than 90%.

8. The tire according to claim 1, wherein the cap layer is stacked on the intermediate layer, and the intermediate layer is stacked on the base layer.

9. The tire according to claim 1, wherein, at a center of a land portion in a width direction, a ratio of a thickness of the cap layer to a thickness of the tread is not less than 10% and not greater than 40%.

10. The tire according to claim 1, wherein at a center of a land portion in a width direction, a ratio of a thickness of the intermediate layer to a thickness of the tread is not less than 30% and not greater than 70%.

11. The tire according to claim 1, wherein an outer end of the tread of the tire is disposed outwardly of the outer end of the cap layer in the axial direction.

12. The tire according to claim 1, wherein
    the loss tangent of the base layer at 30° C. is not greater than 0.11,
    the loss tangent of the intermediate layer at 30° C. is not greater than 0.15 and not less than 0.11, and the loss tangent of the cap layer at 30° C. is not less than 0.15 and not greater than 0.30.

13. The tire according to claim 1, wherein the difference between the axial width of the cap layer and the axial width of the base layer is not less than −5 mm and not greater than 5 mm.

14. The tire according to claim 1, wherein the tire further comprises:
- each sidewall of the pair of sidewalls is continuous with an end of the tread and disposed inwardly of the tread in the radial direction,
- a pair of clinches, and each clinch is disposed inwardly of the sidewall in the radial direction and each clinch is configured to contact a rim,
- a pair of beads, and each bead is disposed inwardly of the clinch in the axial direction,
- a carcass disposed inwardly of the tread, the pair of sidewalls, and the pair of clinches, in the radial direction, and the carcass extends on and between one of the beads and the other of the beads,
- a belt disposed inwardly of the tread in the radial direction and stacked on the carcass from an outer side in the radial direction,
- a band disposed between the tread and the belt in the radial direction, and stacked on the belt in a portion inward of the tread,
- a pair of cushions spaced from each other in the axial direction and disposed between the carcass, an end of the belt, and an end of the band,
- a pair of chafers, and each chafer is disposed inwardly of the bead in the radial direction, and
- an inner liner disposed inwardly of the carcass in the radial direction and forms an inner surface of the tire.

15. The tire according to claim 1, wherein a thickness of the intermediate layer increases as the intermediate layer extends from an outermost portion of the outer end of the cap layer in the axial direction towards an outermost portion of the outer end of the intermediate layer in the axial direction.

16. A tire comprising:
- a tread configured to come into contact with a road surface,
- wherein the tread comprises a cap layer, an intermediate layer formed such that a loss tangent of the intermediate layer at 30° C. is less than a loss tangent of the cap layer at 30° C., and a base layer formed such that a loss tangent of the base layer at 30° C. is less than the loss tangent of the intermediate layer at 30° C.,
- wherein the intermediate layer is disposed outwardly of the base layer in a radial direction, and the cap layer is disposed outwardly of the intermediate layer in the radial direction,
- wherein an outer end of the intermediate layer is disposed outwardly of an outer end of the base layer in an axial direction, and an outer end of the cap layer is disposed inwardly of the outer end of the intermediate layer in the axial direction,
- wherein a difference between an axial width of the cap layer and an axial width of the base layer is not less than −10 mm and not greater than 10 mm,
- wherein a difference between an axial width of the intermediate layer and the axial width of the cap layer is not less than 10 mm and not greater than 30 mm, wherein the tire defines a reference ground contact surface, the reference ground contact surface of the tire being obtained when the tire is mounted on a normal rim, an internal pressure of the tire is adjusted to 230 kPa, a vertical load is applied to the tire that is 70% of a normal load, and the tire is brought into contact with a planar road surface, and a position, on an outer surface of the tire, corresponding to an outer end of the reference ground contact surface in the axial direction is a reference ground contact end,
- wherein the outer end of the cap layer is disposed outwardly of the reference ground contact end in the axial direction, and
- wherein a thickness of the intermediate layer increases as the intermediate layer extends from an outermost portion of the outer end of the cap layer in the axial direction towards an outermost portion of the outer end of the intermediate layer in the axial direction.

17. The tire according to claim 16, wherein
the loss tangent of the base layer at 30° C. is not greater than 0.11,
the loss tangent of the intermediate layer at 30° C. is not greater than 0.15 and not less than 0.11, and
the loss tangent of the cap layer at 30° C. is not less than 0.15 and not greater than 0.30.

18. The tire according to claim 16, wherein a ratio of the loss tangent of the cap layer at 30° C. to the loss tangent of the intermediate layer at 30° C. is not less than 150% and not greater than 230%.

19. The tire according to claim 16, wherein a difference between the axial width of the intermediate layer and the axial width of the base layer is not less than 6 mm and not greater than 14 mm.

20. The tire according to claim 16, wherein a ratio of the axial width of the cap layer to a cross-sectional width of the tire is not less than 75% and not greater than 85%.

* * * * *